United States Patent

Kaneko et al.

[11] Patent Number: 6,124,916
[45] Date of Patent: Sep. 26, 2000

[54] IN PLANE LCD WITH AN ELECTRICALLY CONDUCTIVE BEAD CONNECTING THE COUNTER ELECTRODE ON A FIRST SUBSTRATE TO A THIRD ELECTRODE ON A SECOND SUBSTRATE

[75] Inventors: Yasushi Kaneko; Kyoko Tsukada, both of Sayama, Japan

[73] Assignee: Citizen Watch Co., Ltd., Tokyo, Japan

[21] Appl. No.: 08/945,880

[22] PCT Filed: Mar. 13, 1997

[86] PCT No.: PCT/JP97/00800

§ 371 Date: Nov. 12, 1997

§ 102(e) Date: Nov. 12, 1997

[87] PCT Pub. No.: WO97/34191

PCT Pub. Date: Sep. 18, 1997

[30] Foreign Application Priority Data

Mar. 14, 1996 [JP] Japan .................................. 8-056599
Sep. 10, 1996 [JP] Japan .................................. 8-238731

[51] Int. Cl.$^7$ .................................................. G02F 1/1343
[52] U.S. Cl. ........................... 349/141; 349/139; 349/145
[58] Field of Search ..................................... 349/141, 139, 349/145

[56] References Cited

U.S. PATENT DOCUMENTS 5,831,707 11/1998 Ota et al. ................................ 349/141

FOREIGN PATENT DOCUMENTS

| 0 289 415 | 11/1988 | European Pat. Off. . |
| 0 620 472 | 10/1994 | European Pat. Off. . |
| 63-21907 | 5/1988 | Japan . |
| 2-156225 | 6/1990 | Japan . |
| 2-220032 | 9/1990 | Japan . |
| 7-159807 | 6/1995 | Japan . |

*Primary Examiner*—Kenneth Parker
*Assistant Examiner*—Heidi L Eisenhut
*Attorney, Agent, or Firm*—Armstrong, Westerman, Hattori, McLeland & Naughton

[57] ABSTRACT

On a first substrate constituting a liquid crystal display there are disposed a first electrode (13) and a second electrode (14), a non-linear resistance element (9) being placed at an intersection between a part of the first electrode and a part of the second electrode, an isolated island-like third electrode (16) constituting an electrode pair in conjunction with the second electrode (14). On a second substrate there is disposed an counter electrode (15) extending in the perpendicular direction intersecting the first electrode (13), the counter electrode (15) being opposed to a portion (16a) of the third electrode on the first substrate to accommodate therebetween conductive beads (7) for electrically connecting the counter electrode (15) and the third electrode (16) with each other in a liquid crystal. Then, by applying a voltage between the first electrode (13) and the counter electrode (15), a voltage is applied between the second electrode (14) and the third electrode (16) by way of the non-linear resistance element (9) and the conductive beads (7), thereby generating an electric field in the direction parallel to the surface of the substrate to turn molecules of the liquid crystal to the direction parallel to the surface of the substrate, to generate a contrast for display.

10 Claims, 8 Drawing Sheets

IN PLANE LCD WITH AN ELECTRICALLY CONDUCTIVE BEAD CONNECTING THE COUNTER ELECTRODE ON A FIRST SUBSTRATE TO A THIRD ELECTRODE ON A SECOND SUBSTRATE

TECHNICAL FIELD

The present invention relates to a monochrome or color liquid crystal display being widely used as a display for clocks, electronic calculators, video cameras or various other electronic equipment. More particularly, it relates to a liquid crystal display with a wide visual field angle having a low cost, which has, on one of two substrates containing a liquid crystal sealed thereinbetween, a pair of electrodes for forming an electric field in a direction parallel to the substrate and a non-linear resistance element having a "metal-insulator-metal" structure for switching a voltage applied to the electrodes.

BACKGROUND ART

In a conventional liquid crystal display, the display has been performed in the twisted nematic (TN) mode or in the super twisted nematic (STN) mode, in which both a first substrate and a second substrate are typically provided with respective electrodes for driving a liquid crystal and in which an electric field normal to the substrates is applied to the liquid crystal.

However, the mode using multiplex driving for the liquid crystal display of a simple matrix configuration results in a reduction in contrast or in a reduction in the speed of response varying as scanning lines are increased, and hence it becomes difficult to obtain a satisfactory contrast in the case of having about 200 scanning lines.

Thus, in order to eliminate such a deficiency, there tends to be employed an active-matrix mode liquid crystal panel, in which individual pixels are each provided with switching elements.

This active-matrix mode liquid crystal panel is largely classified into a three-terminal system using a thin-film transistor as the switching element and a two-terminal system using a non-linear resistance element. Of these, the two-terminal system is superior in that it is simple in structure and in its manufacturing process.

As this two-terminal system there have been developed a diode type, a varistor type, an MIM (Metal-Insulator-Metal) type, etc.

Among them, the MIM type is characterized in that it is especially simple in structure and has a shortened manufacturing process.

Furthermore, the liquid crystal display panel needs a high density as well as a high definition, so that it is necessary to reduce the area occupied by the switching elements.

The means for achieving that high density and high definition include a photolithography technique and an etching technique which are micro-treatment techniques in the semiconductor manufacturing technique. However, even though this semiconductor manufacturing technique has been used, it is extremely difficult to perform the microtreatment over a larger area and to achieve a low cost.

Next, a structure of a switching element effective for an enlargement of area and in a reduction in cost will be described with reference to FIG. 13 which is a plan view illustrating an example of the conventional liquid crystal display, and to FIG. 14 which is a sectional view taken along a line J—J thereof.

Figure 14:
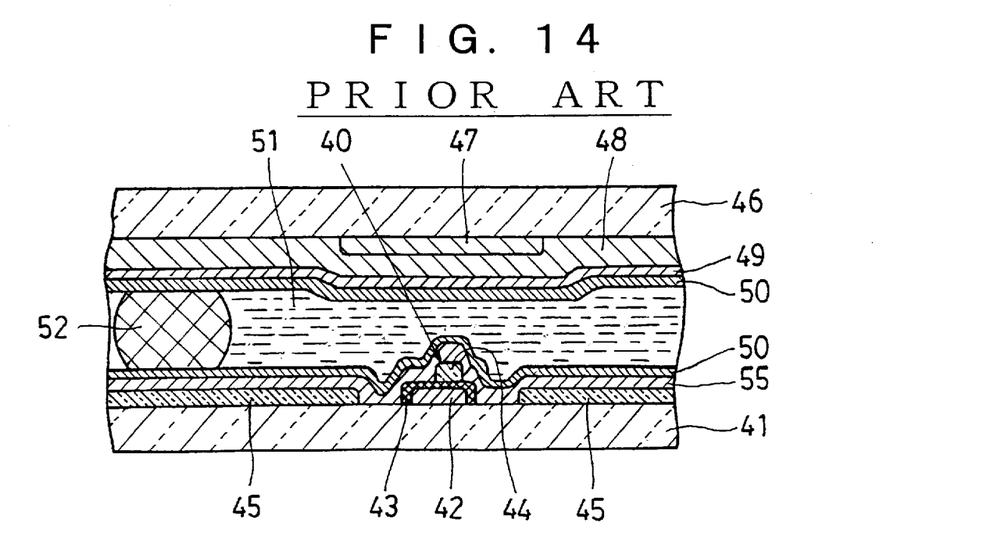
FIG. 14 is a sectional view taken along the line J—J of FIG. 13.

This liquid crystal display, as shown in FIG. 14, comprises a first substrate 41 and a second substrate 46 which are made of a transparent material and are opposed to each other by way of plural spacers 52 located at a predetermined distance, with a liquid crystal 51 being sealed thereinbetween.

On the first substrate 41 there is disposed for each pixel part a lower electrode 42 serving as a first electrode extending from a signal electrode 53, on which lower electrode 42 is formed a non-linear resistive layer 43 by means of an anodization method.

Moreover, an upper electrode 44 serving as a second electrode is disposed on the non-linear resistive layer 43 in an overlapping manner, to constitute a non-linear resistance element 40.

Figure 13:
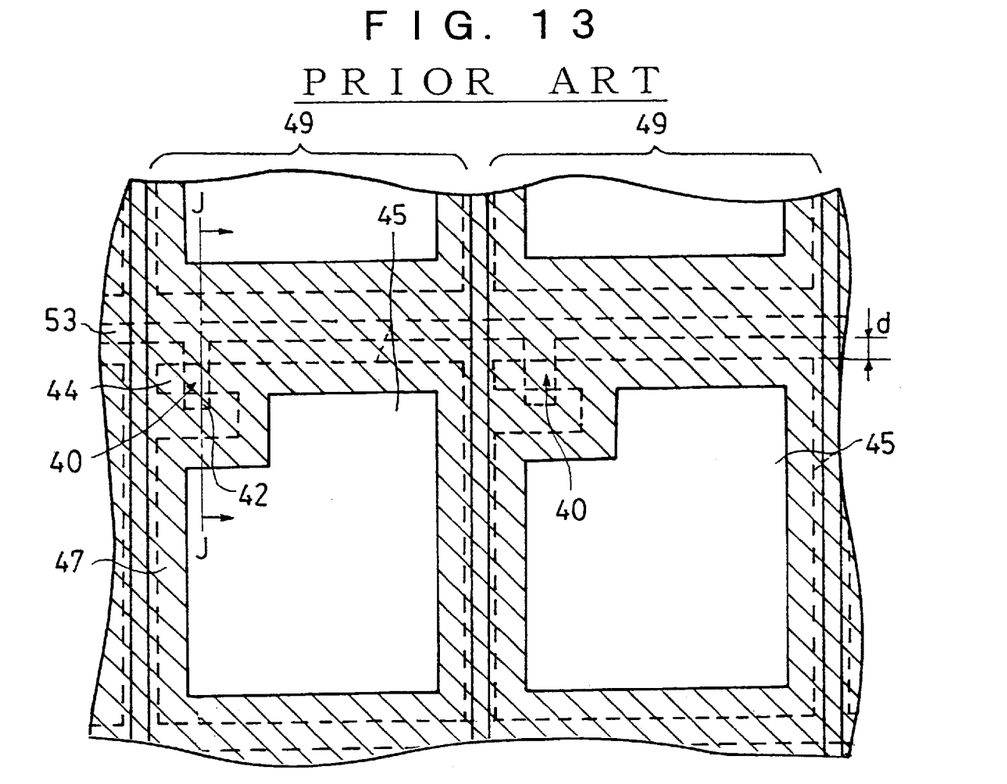
FIG. 13 is a diagrammatic enlarged plan view illustrating a region of a conventional example of a liquid crystal display using non-linear resistance elements.

The upper electrode 44 as shown in FIG. 13 extends from a transparent display electrode 45 on a pixel part by pixel part basis, the second electrode being constituted of the upper electrode 44 and the display electrode 45.

On the other hand, a surface of the second substrate 46 confronting the first substrate 41 is provided with a black matrix 47 formed over the entirety of a shaded region shown in FIG. 13, in order to prevent any leakage of light through gaps between the display electrodes 45 disposed on the first substrate 41. In other words, non-display areas are provided with the black matrices 47 serving as light-blocking sections.

Furthermore, by way of a protective film 48 made of an organic material to prevent a short circuit resulting from any contact with the black matrix 47, a transparent counter electrode 49 is disposed in the form of a belt as shown in FIG. 13 on the second substrate 46 in such a manner as to confront the display electrode 45 as shown in FIG. 14.

Also, in order to protect the non-linear resistance element 40, an insulating film 55 made of tantalum oxide is disposed on the first substrate 41 and an opening is formed by dry etching at the connection with an external circuit.

As treatment layers for orderly arranging molecules of the liquid crystal 51, alignment layers 50, 50 are then disposed on the first substrate 41 and the second substrate 46, respectively.

As shown in the plan view of FIG. 13, the signal electrode 53 and the display electrode 45 have an interval equal to a predetermined dimension d therebetween.

The display electrode 45 is placed with respect to the liquid crystal 51 so as to overlap the counter electrode 49 and becomes each pixel part in a matrix-like display region consisting of a plurality of signal electrodes 53 having the non-linear resistance elements 40 and of a plurality of counter electrodes 49.

By making use of a variation in transmittance of the liquid crystal 51 in the region between the display electrode 45 and a portion of the counter electrode 49 in which no black matrix 47 is formed, the liquid crystal display can execute a predetermined image display.

It is to be noted that in FIG. 13 dotted lines indicate the lower electrode 42, the signal electrode 53, the upper electrode 44 and the display electrode 45 on the first substrate 41, with the non-linear resistive layer 43, the protective film 48, the insulating film 55 and the alignment layer 50 being not shown, and that the black matrix 47 and the counter electrode 49 on the underside of the second substrate 46 are indicated by solid lines.

At the time of actual display, in such a liquid crystal display, an electric field is applied between the first substrate 41 and the second substrate 46 in the direction perpendicular to the substrates so that molecules of the liquid crystal are turned from an orientation parallel to the substrates to an orientation normal to the substrates, thereby performing the display image.

Thus, in the conventional liquid crystal display, the electrodes for driving the liquid crystal are formed on the first substrate and the second substrate, and an electric field in the direction perpendicular to the substrates is applied to the liquid crystal to allow the display action to be carried out.

For this reason, the conventional liquid crystal display has presented a greater so-called dependence of display quality on the visual field angle, in which the display quality such (as contrast) varies depending on the viewing angle.

Measures to improve such a dependence on the viewing angle include means for correcting a phase difference in the direction of the liquid crystal molecules by utilizing a retardation film and means to manage the orientation of the liquid crystal molecules.

However, the measures using the retardation film are less effective in improving the dependence on the visual field angle. It is also difficult for the measures to manage the orientation of the liquid crystal molecules to ensure a stabilized orientation.

To this end, as can be seen in, for example, Japanese Patent Pub. No. sho63-21907, a liquid crystal display panel has been developed in which on a first substrate having non-linear resistance elements formed thereon there are disposed comb-teeth type electrodes in pairs on a pixel by pixel basis, with a voltage being applied between the comb-teeth type electrodes to control the liquid crystal molecules to turn to the direction parallel to the substrates. Such a method of controlling the liquid crystal molecules is called the IPS (In-Plane-Switching) method.

Figure 15:
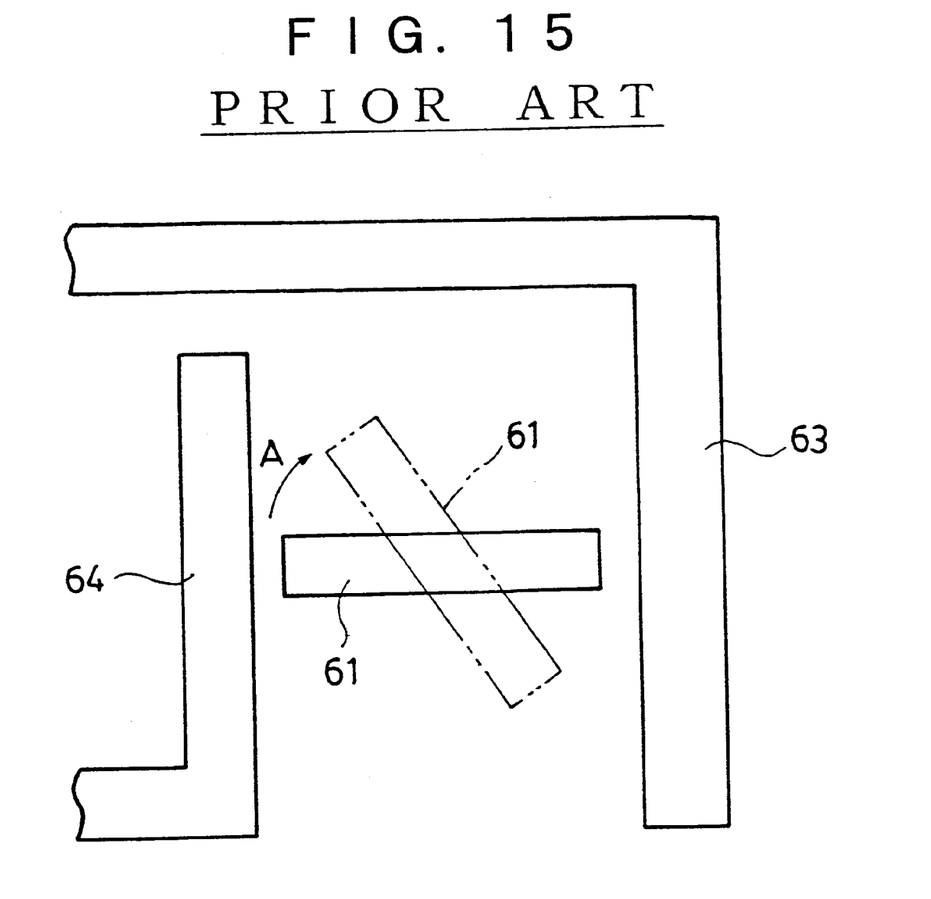
FIG. 15 is a diagrammatic enlarged plan view illustrating a region of a conventional liquid crystal display panel using a comb-teeth type electrode.

This is simply described with reference to FIG. 15, which is a diagrammatic enlarged plan view showing a fragmentary region of the liquid crystal display panel using the comb-teeth type electrodes.

As shown in this diagram, a first comb-teeth type electrode 63 and a second comb-teeth type electrode 64 are placed at a certain distance on the first substrate on a pixel part by pixel part basis.

A variation in magnitude of a voltage applied between the first comb-teeth type electrode 63 and the second comb-teeth type electrode 64 results in a change in the direction of the major axes of liquid crystal molecules 61 of the liquid crystal sealed in between the first and second substrates.

In the case of using a liquid crystal material having a negative dielectric anisotropy, the liquid crystal molecules 61 are maintained in the state indicated by a solid line during the application of a voltage smaller than a threshold voltage. On the contrary, when a voltage larger than the threshold voltage is applied, the liquid crystal molecules 61 are turned in the direction indicated by an arrow A and remain at the position indicated by an imaginary line. The liquid crystal molecules 61 are almost never pre-tilted relative to the first substrate and move substantially parallel to the first substrate.

On both sides of this liquid crystal panel there are arranged polarizing plates in such a manner that the transmission axes orthogonally intersect each other and that the transmission axis of either polarizing plate is parallel to the major axes of the liquid crystal molecules 61. Then, by varying the voltage applied between the first comb-teeth type electrode 63 and the second comb-teeth type electrode 64, the orientation of the liquid crystal molecules 61 are turned to execute the display.

More specifically, when the liquid crystal molecules 61 lie at the position indicated by the solid line, incident polarized light advances intactly straight and is blocked by the polarizing plate on the exit side, resulting in a black display. On the contrary, when the liquid crystal molecules 61 turn to the position indicated by the imaginary line, the incident polarized light enters at an angle of about 45 degrees relative to the liquid crystal molecules 61 to cause a phase difference. A white display is thus obtained by setting the birefringence of the liquid crystal and the cell gap so that the phase difference becomes equal to half of the wavelength.

However, in the case of incorporating the means to provide this comb-teeth type electrode into the liquid crystal display having the non-linear resistance elements, the two types of electrodes, that is, the first comb-teeth type electrode 63 and the second comb-teeth type electrode 64 need to intersect each other on the first substrate. The intersection between these two electrodes must be carefully considered so as not to bring about any electrical short circuit between the two electrodes.

Although as a measure against this, it is conceivable to provide an insulating film at the intersection between the two electrodes on the first substrate, this method needs an increase in thickness of the insulating film, disadvantageously resulting in not only an increase in the number of the manufacturing steps but also in a complicated process.

DISCLOSURE OF THE INVENTION

It is an object of the present invention to provide a liquid crystal display in which an electric field in the direction parallel to the substrate is formed by a pair of electrodes as described above, the direction of molecules of the liquid crystal being controlled for display by means of the IPS method to improve its dependence on viewing angle, thereby securely preventing any electrical short circuit between the two types of electrodes without bringing about a complication in the manufacturing process.

The liquid crystal display in accordance with the present invention is of a type in which a liquid crystal is sealed in between a first substrate and a second substrate which are opposed to each other in a parallel relationship, with a pair of electrodes being arranged on the first substrate so as to form an electric field in the direction parallel to the substrate, and in which in response to an electric field arising from a potential difference between the pair of electrodes, the direction of the major axes of molecules of the liquid crystal is turned to the direction substantially parallel to the surface of one substrate to thereby obtain a contrast for performing a display. In order to achieve the above object, the liquid crystal display is configured as follows.

On the first substrate there are arranged a first electrode, a second electrode, a non-linear resistance element placed at intersections between a part of the first electrode and a part of the second electrode, and an isolated island-like third electrode constituting the pair of electrodes in conjunction with the second electrode.

On the other hand, a surface of the second substrate confronting the first substrate is provided with a counter electrode extending in the perpendicular direction intersecting the first electrode, the counter electrode being opposed to a portion of the third electrode on the first substrate.

Then, between the counter electrode and the portion of the third electrode which are opposed to each other there are disposed conductive members for electrically connecting the counter electrode and the third electrode with each other in the liquid crystal.

Such a configuration makes it possible to avoid the coexistence of the first electrode (signal electrode) and the counter electrode on the same substrate and to prevent any electrical short circuit between the two electrodes, thereby ensuring a secure electrical connection between the counter electrode and the third electrode by way of the conductive members.

The liquid crystal display may be configured so that, on the first substrate there are arranged a first electrode, a second electrode, an isolated electrode, a pair of non-linear resistance elements placed at intersections between a part of the first electrode and the isolated electrode and between a part of the second electrode and the isolated electrode, respectively, and an isolated island-like third electrode constituting the pair of electrodes in conjunction with the second electrode, the non-linear resistance elements as switching elements being constituted as a pair of inverse-parallel connected non-linear resistance elements to enable the voltage-current characteristics to be symmetrical with respect to positive and negative.

In these liquid crystal displays, use as the above conductive members of conductive beads comprised of resilient beads with an electrical conductivity imparted thereto makes it possible to accommodate a variability in the bead diameter or a variability in the distance between the first substrate and the second substrate to ensure a stabilized electrical connection.

Furthermore, on the first substrate there is disposed an insulating film having an opening at an area corresponding to a portion of the third electrode, with a slant portion being formed around the opening of the insulating film so that the conductive beads are guided and gathered into the opening with the aid of the slant portion, whereby the conductive beads are used exclusively for electrical connection between the electrodes, contributing to a more secure electrical connection.

Alternatively, conductive beads dispersed in an adhesive may be interposed between the counter electrode and a portion of the third electrode by means of a printing method. This also enables the conductive beads to be securely arranged at desired positions to ensure a secure electrical connection between the electrodes.

Furthermore, by providing either one of the second electrode and the third electrode in the form of a comb-teeth type electrode, there is achieved an effective generation of an evenly strong electric field between the two electrodes.

BEST MODE FOR CARRYING OUT THE INVENTION

Embodiments of a liquid crystal display according to the present invention will now be described with reference to the drawings.

First Embodiment

Reference is made to FIGS. 1 to 4 in order to describe a configuration of the liquid crystal display in accordance with the first embodiment of the present invention.

Figure 3:
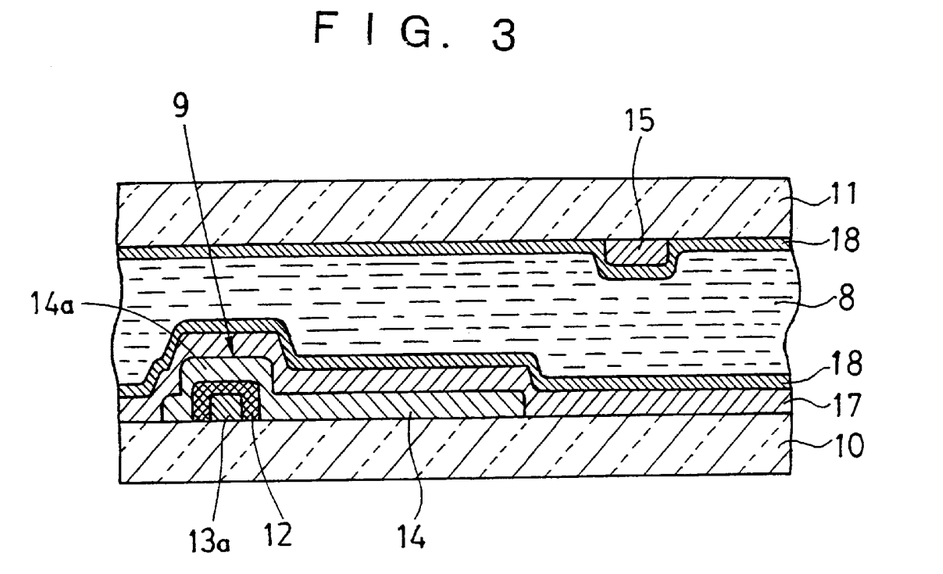
FIG. 3 is a sectional view taken along the line A—A of FIG. 1.
Figure 4:
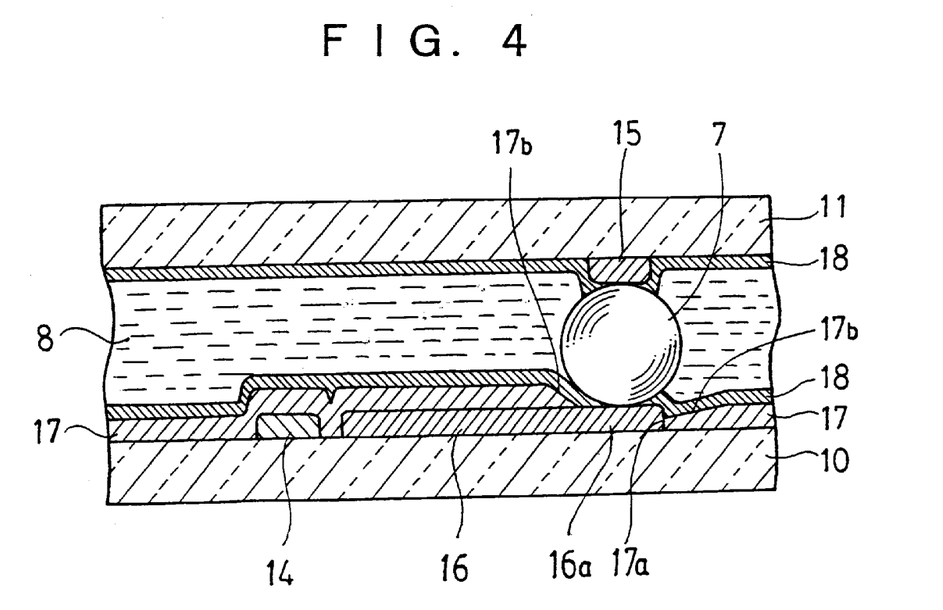
FIG. 4 is a sectional view taken along the line B—B of FIG. 1.

In the same manner as the conventional ones, this liquid crystal display as illustrated in FIGS. 3 and 4 in section comprises a first substrate 10 and a second substrate 11 which are made of a transparent material and confront each other at a predetermined distance to contain a liquid crystal 8 sealed thereinbetween.

Disposed on the first substrate 10 are M lines of first electrodes 13 (see FIG. 2) made of a tantalum (Ta) film and comb-teeth type second electrodes 14 made of a chromium (Cr) film. For each pixel part, the first electrode 13 includes a lower electrode 13a projecting over the surface of the substrate and the second electrode 14 includes an upper electrode 14a projecting over the surface of the substrate, the lower electrode 13a and the upper electrode 14a orthogonally intersect each other, with a non-linear resistance element 9 being provided at the intersection.

On top of the surface of the lower electrode 13a there is formed a non-linear resistive layer 12 (see FIG. 3) made of a tantalum oxide ($Ta_2O_5$) layer, that is serving as an anodized film for the first electrode 13. The upper electrode 14a is disposed on the non-linear resistive layer 12.

Thus, the lower electrode 13a, the non-linear resistive layer 12 and the upper electrode 14a constitute a non-linear resistance element 9 of the MIM type.

On the other hand, the surface of the second substrate 11 confronting the first substrate 10 is provided with N lines of strip-like counter electrodes 15 (see FIG. 2) made of a chromium (Cr) film which extend in the direction orthogonal to the first electrodes 13 at predetermined pixel intervals.

Figure 2:
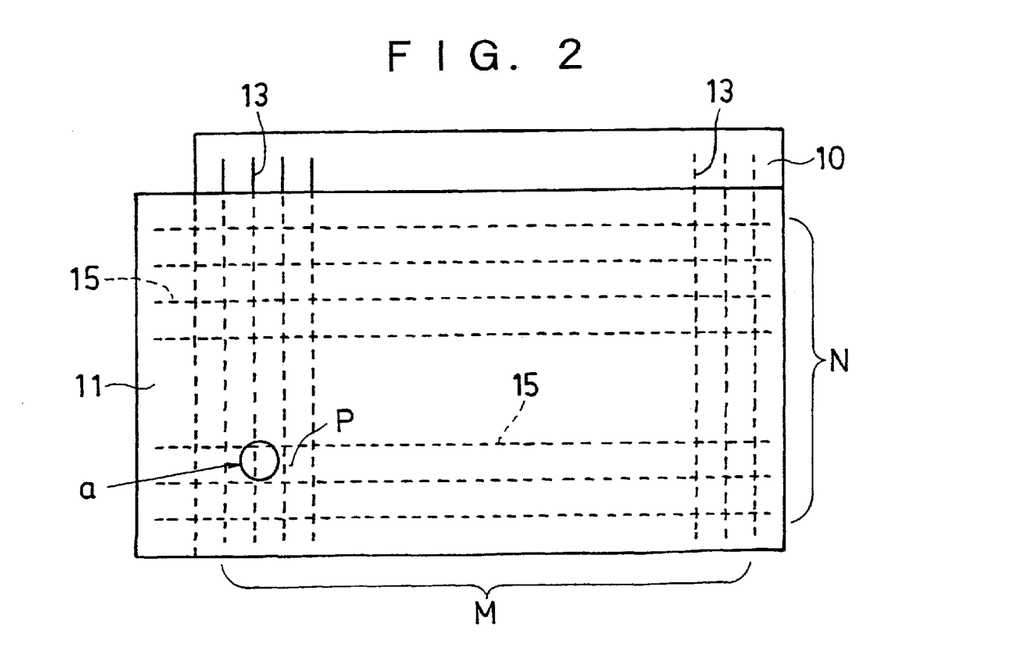
FIG. 2 is a plan view of the entire liquid crystal display illustrating the first embodiment of the present invention.

Therefore, the first electrodes (signal electrodes) 13 on the first substrate 10 and the counter electrodes 15 on the second substrate 11 form plural display pixel parts P in a matrix as illustrated in FIG. 2.

Figure 1:
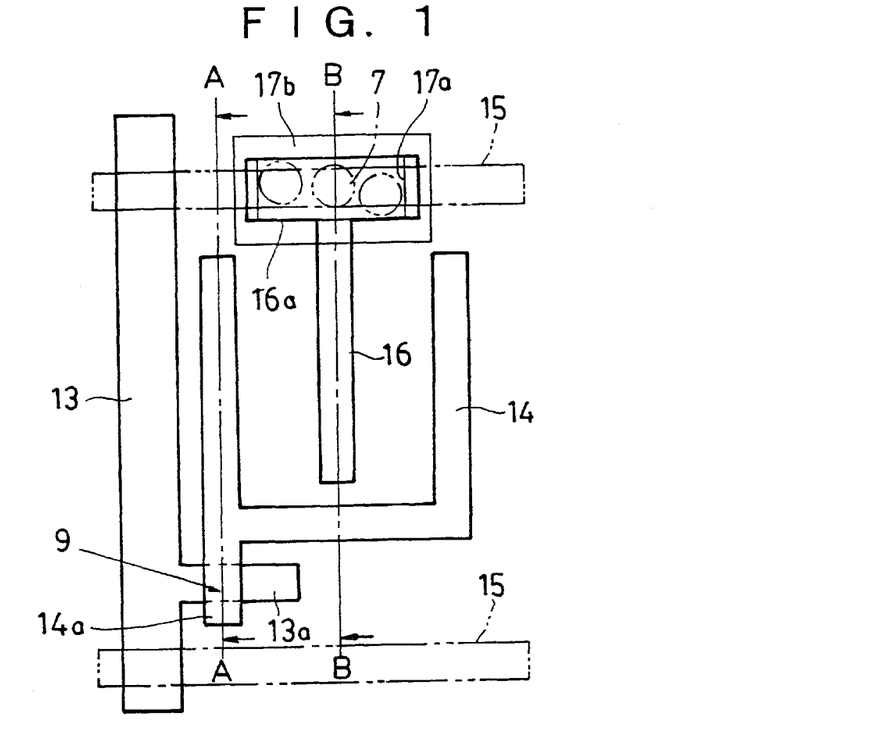
FIG. 1 is a diagrammatic enlarged plan view of an area surrounded by the circle a in FIG. 2 of a liquid crystal display illustrating a first embodiment of the present invention.

As is apparent from FIG. 1, further disposed on the first substrate 10 are T-shaped third electrodes 16 made of a chromium (Cr) film and extending in the form of islands between the comb-teeth type second electrodes 14 so as to confront the latter in the same plane. A portion 16a of the T-shaped third electrode 16 is so positioned as to confront (overlap) the counter electrode 15 on the second substrate 11.

In order to protect the non-linear resistance element 9, an insulating film 17 made of a tantalum oxide ($Ta_2O_5$) film is disposed over the entire surface of the first substrate 10 (see FIGS. 3 and 4).

This insulating film 17 as illustrated in FIGS. 1 and 4 includes an opening 17a at a position corresponding to the portion 16a of the third electrode 16 and a slant portion 17b surrounding the opening 16a and having a thickness of the insulating film 17 which is gradually decreased toward the opening 17a.

The first substrate 10 and the second substrate 11 are farther formed with respective alignment layers 18, 18 serving as treating layers for orderly arranging molecules of the liquid crystal 8.

The thus configured first substrate 10 and second substrate 11 are opposed to each other at a predetermined distance, with a plurality of conductive beads 7 intervening between the portion 16a of the third electrode 16 and the counter electrode 15 in each pixel part, the conductive beads being each comprised of a resilient bead coated with gold to impart an electrical conductivity thereto. The first substrate 10 and the second substrate 11 are then joined together at their peripheries by means of a sealing agent (not shown) so as to allow the liquid crystal 8 to be sealed thereinbetween.

At that time, the conductive beads 7 are guided by the slant portion 17b of the insulating film 17 and gather into the opening 17a located on the portion 16a of the third electrode 16. Since the alignment layer 18 has an extremely small thickness in the order of 0.05 $\mu$m and is soft, it is ruptured by the conductive beads 7, so that the conductive beads 7 come into electrical contact with the third electrodes 16 on the first substrate 10. The alignment layer 18 overlying the counter electrodes 15 on the second substrate 11 is also ruptured by the conductive beads 7, so that the conductive beads 7 come into electrical contact with the counter electrodes 15.

As a result, an electrical connection is achieved between the counter electrodes 15 and the third electrodes 16 by way of the conductive beads 7 resting on the openings 11a.

Thus, when a voltage is applied between the first electrodes 13 on the first substrate 10 and the counter electrodes 15 on the second substrate 11, the voltage is applied between the comb-teeth type second electrodes 14 and the third electrodes 16 by way of the non-linear resistance elements 9 serving as the switching elements and of the above-described conductive beads 7, thereby generating an electric field in the direction parallel to the surface of the substrate.

Therefore, a variation in the applied voltage results in a change in orientation of major axes of molecules of the liquid crystal 8, enabling a display image to be performed by the IPS method described above.

More specifically, in the case of application of a voltage smaller than a threshold voltage the orientation of the molecules of the liquid crystal 8 is retained in the direction restricted by the alignment layer 18, whereas upon the application of a voltage larger than the threshold voltage the molecules of the liquid crystal 8 are turned by a predetermined angle between the comb-teeth type second electrodes 14 and the T-shaped third electrodes 16 and are retained at those resulting positions.

At that time, the molecules of the liquid crystal 8 have hardly any pre-tilt relative to the first substrate 10 and move substantially parallel to the first substrate 10, thereby ensuring very satisfactory visual field angle properties.

It is to be noted that the liquid crystal 8 used can have either positive or negative dielectric anisotropy. In the case of using a liquid crystal material having positive dielectric anisotropy, the rubbing direction of the alignment layers 18 is made substantially parallel to the first electrodes 13 so that when a voltage is applied, the liquid crystal molecules turn to the direction parallel to the counter electrodes 15 between the second electrodes 14 and the third electrodes 16.

In the case of using a liquid crystal material having negative dielectric anisotropy, the rubbing direction of the alignment layers 18 is made substantially parallel to the counter electrodes 15 so that when a voltage is applied, the liquid crystal molecules turn to the direction parallel to the first electrodes 13 between the second electrodes 14 and the third electrodes 16.

By rendering either one of the second electrodes 14 and the third electrodes 16 as the comb-teeth type electrodes, there is ensured an effective generation of an evenly strong electric field between the two electrodes.

More specific dimensional examples in this embodiment are as follows. The width of the first electrode 13 and the widths of the comb-teeth type second electrode 14 and the T-shaped third electrode 16 and the counter electrode 15 are equally 20 $\mu$m. It is to be appreciated that in order to ensure a stable electrical connection, the width of a portion of the counter electrode 15 overlapping the third electrode 16 and the width of the portion 16a of the T-shaped third electrode 16 confronting the counter electrode 15 are preferably larger than the widths (20 $\mu$m) of the other portions of the counter electrode 15.

Moreover, the opening 17a in the insulating film 17 overlying the T-shaped third electrode 16 has dimensions of 50 $\mu$m×20 $\mu$m, and the slant portion 17b in the insulating film 17 surrounding the opening has dimensions of 70 $\mu$m×35 $\mu$m.

In the region from the periphery of the slant portion 17b down to the opening 17a, the thickness of the insulating film 17 varies linearly.

The provision of such a slant portion 17b allows the conductive beads 7 scattered on the slant portion 17b to gather into the opening 17a, thereby effecting a secure electrical connection between the T-shaped third electrode 16 on the first substrate 10 and the counter electrode 15 on the second substrate 11. For this reason, the number of the conductive beads 7 to be scattered need not be particularly increased as compared with the number of the conventional spacers (see FIG. 14).

In this embodiment, the conductive beads 7 of 5.0 $\mu$m in diameter were scattered at the rate of 500 beads/$mm^2$.

Although in this case the diameters of the conductive beads 7 are about a quarter of the width of the counter electrode 15, the conductive bead 7 is illustrated in the sectional view of FIG. 4 in a significantly enlarged scale compared with its actual dimensions since the distance between the first substrate 10 and the second substrate 11 is shown much wider for the convenience of illustration. Also in FIG. 1, in response to this, the diameters of the conductive beads 7 indicated by imaginary lines are enlarged to an extent equivalent to the width of the counter electrode 15.

According to the liquid crystal display configured in this manner, there can be obtained a liquid crystal display having no observable light voids arising from the conductive beads 7 in direct viewing that is free from any deficiencies due to electrical short circuit of wiring, and that is a wide viewing angle, and achieves a its high contrast.

Thus, in the liquid crystal display which has a non-linear resistance element serving as a switching element between the first electrode and the second electrode on the first substrate and in which a voltage applied between the second electrode and the third electrode confronting the second electrode in the same plane is varied to turn the molecules of the liquid crystal to the direction parallel to the substrates for effecting display, any fear of a short circuit occurring between the first electrode and the third electrode can be eliminated since the two electrodes do not intersect each other on the same substrate, and a secure application of voltage can be achieved between the second electrode and the third electrode.

Although for an electrical connection between the T-shaped third electrode 16 and the counter electrode 15, use has been made of the conductive beads 7 comprised of resilient beads coated with gold to impart an electrical conductivity thereto, the conductive beads 7 serve also as the conventional spacers and hence there is no need to particularly increase the number of manufacturing steps as compared with the steps for superposing the second substrate on the first substrate in the conventional liquid crystal display. Accordingly, the manufacturing process does not become complicated.

Since this embodiment employs as conductive members the conductive beads comprised of resilient beads with an electrical conductivity, the resiliency which the conductive beads possess can accommodate a variability in bead diameters as well as a variability in distance between the first substrate and the second substrate to thereby stabilize the electrical connection.

However, it is also possible to use other conductive members in place of the conductive beads and it is not essential to provide the slant portion 17b.

Although in the first embodiment described above there have been provided the comb-teeth type second electrode 14, the T-shaped third electrode 16 and the counter electrode 15 which are made of chromium (Cr) films, these three types of electrodes can function as a black matrix for preventing any leakage of light in the liquid crystal display.

It is also possible to obtain an additional function of low reflection by disposing a chromium oxide film on top of these chromium (Cr) films.

The material for the electrodes may be other metals such as aluminum or nickel, other than chromium.

Second Embodiment

Reference is then made to FIGS. 5 to 8 in order to describe a configuration of the liquid crystal display in accordance with a second embodiment of the present invention.

FIGS. 5 to 8 correspond respectively to FIGS. 1 to 4 used for describing the above first embodiment, in which corresponding parts are designated by the same reference numerals and therefore are not again described.

Figure 5:
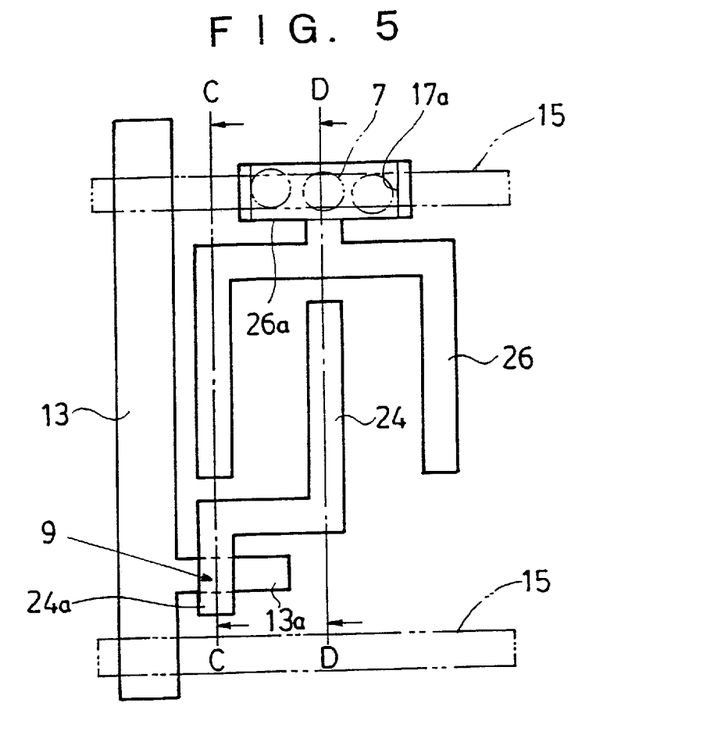
FIG. 5 is a diagrammatic enlarged plan view of an area surrounded by the circle b in FIG. 6 of a liquid crystal display illustrating a second embodiment of the present invention.

This embodiment differs from the first embodiment in the shape of the second electrode and of the third electrode and in the arrangement means for the conductive beads.

Figure 6:
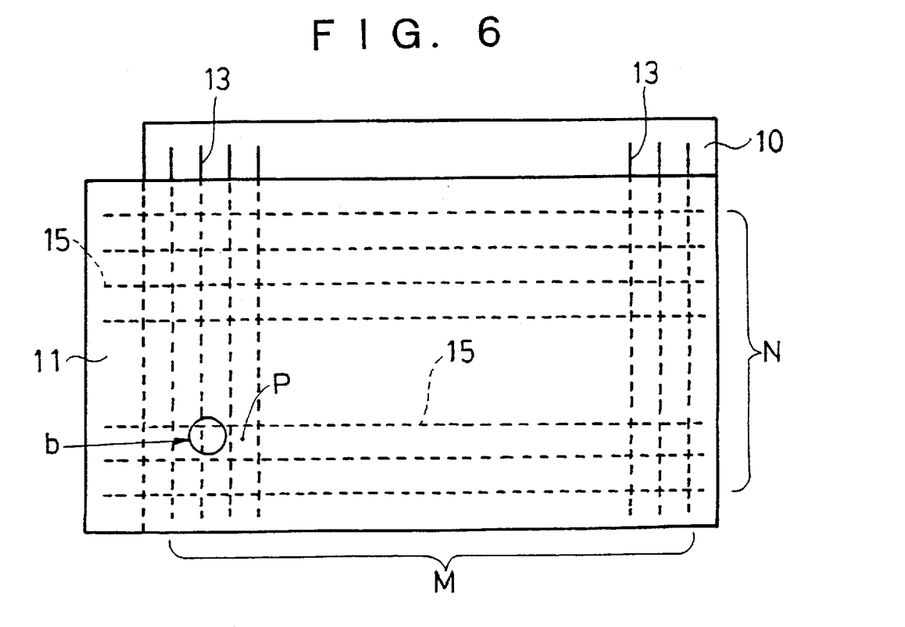
FIG. 6 is a plan view of the entire liquid crystal display illustrating the second embodiment of the present invention.

More specifically, as is apparent from FIG. 5 which is a diagrammatic enlarged plan view of the portion surrounded by the circle b in FIG. 6, on the first substrate 10 there is disposed a strip-like second electrode 24 made of a chromium (Cr) film and having an integrally formed upper electrode 24a constituting the non-linear resistance element 9, the second electrode 24 extending parallel to the first electrode 13.

On the first substrate 10 there is further disposed a comb-teeth type third electrode 26 made of a chromium (Cr) film in such a manner as to confront the second electrode 24 in the same plane. A portion 26a of the comb-teeth type third electrode 26 is so positioned as to confront (overlap) the counter electrode 15 on the second substrate 11.

Figure 7:
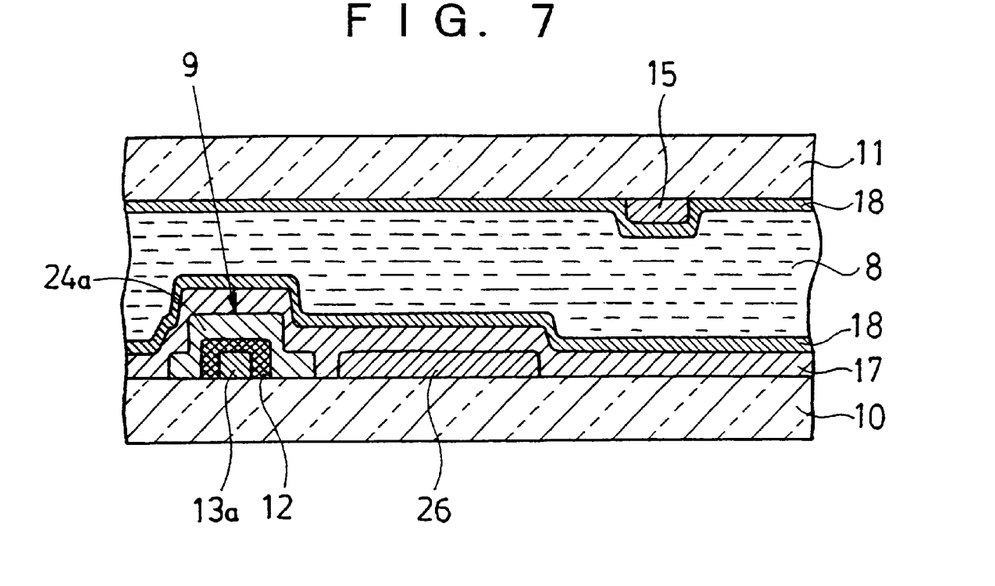
FIG. 7 is a sectional view taken along the line C—C of FIG. 5.
Figure 8:
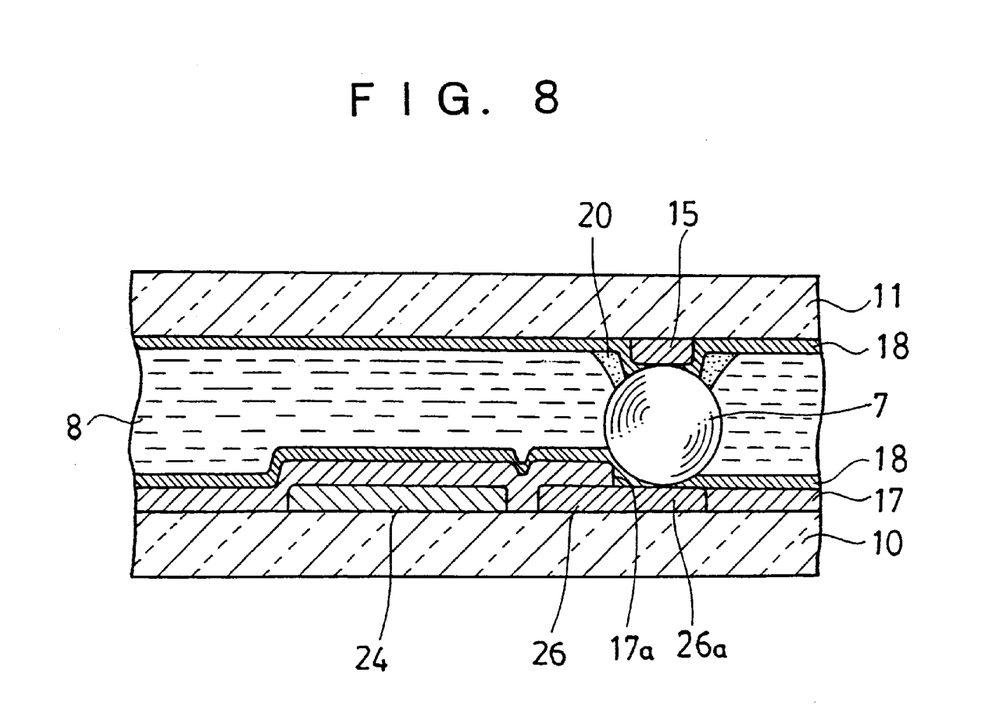
FIG. 8 is a sectional view taken along the line D—D of FIG. 5.

Then, as shown in FIGS. 7 and 8, over the first substrate 10 there is disposed the insulating film 17 made of tantalum oxide ($Ta_2O_5$) film to protect the non-linear resistance element 9, the insulating film 17 having the opening 17a formed on the portion 26a of the third electrode 26. In this embodiment, however, the slant portion is not formed around the opening 17a.

Moreover, in the same manner as the first embodiment, over the first substrate 10 and the second substrate 11 there are disposed alignment layers 18, 18 serving as treating layers for orderly arranging the molecules of the liquid crystal 8.

Subsequently, the conductive beads 7 are dispersed in an adhesive 20 and are disposed on the counter electrode 15 of the second substrate 11. In this embodiment, the conductive beads 7 comprised of resilient beads coated with gold to impart an electrical conductivity thereto are dispersed in the epoxy adhesive 20 and are registered for printing on the counter electrode 15 by means of a screen printing method using a metallic thin film screen. The adhesive 20 is then heated.

The first substrate 10 and the second substrate 11 are then joined together at their peripheries by means of a sealing agent (not shown) so as to allow the liquid crystal 8 to be sealed thereinbetween.

Since the alignment layers 18 have an extremely small thickness on the order of 0.05 µm and are soft, the conductive beads 7 can rupture both the alignment layer 18 on the portion 26a of the comb-teeth type third electrode 26 on the first substrate 10 and the alignment layer 18 on the counter electrode on the second substrate 11, allowing the third electrode 26 to be connected to the counter electrode 15 by way of the conductive beads 7.

Accordingly, by applying a voltage between the second electrode 24 and the third electrode 26 through the non-linear element 9 and the conductive beads 7 from the first electrode 13 and the counter electrode 15, this second embodiment also makes it possible to generate an electric field in the direction parallel to the surface of the substrate to thereby turn the molecules of the liquid crystal 8 to the direction parallel to the surface of the substrate.

In this second embodiment, the width of the first electrode 13 and the widths of the strip-like second electrode 24 and the comb-teeth type third electrode 26 and the counter electrode 15 are equally 20 µm. It is to be appreciated that in order to secure a more stabilized electrical connection the width of a portion of the counter electrode 15 overlapping the third electrode 26 and the width of the portion 26a of the comb-teeth type third electrode 26 confronting the counter electrode 15 are preferably larger than the width (20 µm) of the remaining portions of the counter electrode 15.

Furthermore, the dimensions of the opening 17a in the insulating film 17 on the comb-teeth type third electrode 26 are 50 μm×20 μm. Three to five conductive beads 7 are adhered for each opening 17a by the screen printing method in such a manner that no conductive beads 7 adhere to the gaps between the second electrode 24 and the third electrode 26, which results in a display area.

The thus configured second embodiment also achieves a secure electrical connection between the counter electrode 15 and the comb-teeth type third electrode 26 to provide a liquid crystal display free from any deficiencies arising from an electrical short circuit in wiring, that is less dependent on the visual field angle, and achieves a high contrast and that is easy to manufacture.

Also, in the case of applying a scanning signal to the counter electrode 15, any defective orientations resulting from an oblique electric field which is caused by a deflection in the scanning signal can be prevented by shaping the third electrode 26 like comb teeth, to be connected to the counter electrode 15 as in this embodiment.

Although the second embodiment also has the comb-teeth type third electrode 26, the strip-like second electrode 24 and the counter electrode 15 which are made of chromium (Cr) films, these three types of electrodes can function as a black matrix for preventing any leakage of light in the liquid crystal display.

It is also possible to obtain an additional function of low reflection by disposing a chromium oxide film on top of the chromium (Cr) films.

The material for the electrodes may be other metals such as aluminum or nickel, other than chromium.

Although in this second embodiment the conductive beads 7 dispersed in the adhesive 20 have been printed on the counter electrode 15 on the second substrate 11, naturally they may be printed on the third electrode 26 within the opening 17a in the insulating film 17 over the first substrate 10.

The printing of these conductive beads 7 can be performed also by the intaglio printing method or the relief printing method without being limited to screen printing. Although the conductive beads 7 have been printed after the formation of the alignment layers 18, the printing before the formation of the alignment layers is also possible. It is to be noted that the alignment layer heating temperature is restricted in that case.

Third Embodiment

Referring then to FIGS. 9 to 12, description will be made to a configuration of the liquid crystal display in accordance with a third embodiment of the present invention.

FIGS. 9 to 12 correspond respectively to FIGS. 1 to 4 used for describing the above first embodiment, in which corresponding parts are designated by the same reference numerals and therefore are not again described.

Figure 9:
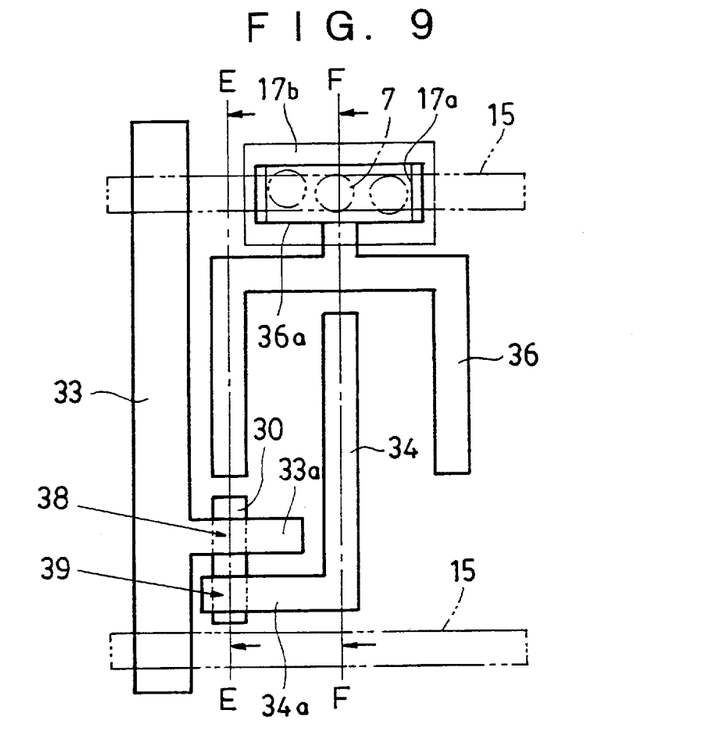
FIG. 9 is a diagrammatic enlarged plan view of an area surrounded by the circle c in FIG. 10 of a liquid crystal display illustrating a third embodiment of the present invention.

This embodiment differs from the first embodiment in the shape of the second electrode and of the third electrode and in that the non-linear resistance element serving as the switching element is comprised of a pair of BTB (Back to Back) connected non-linear resistance elements.

Figure 10:
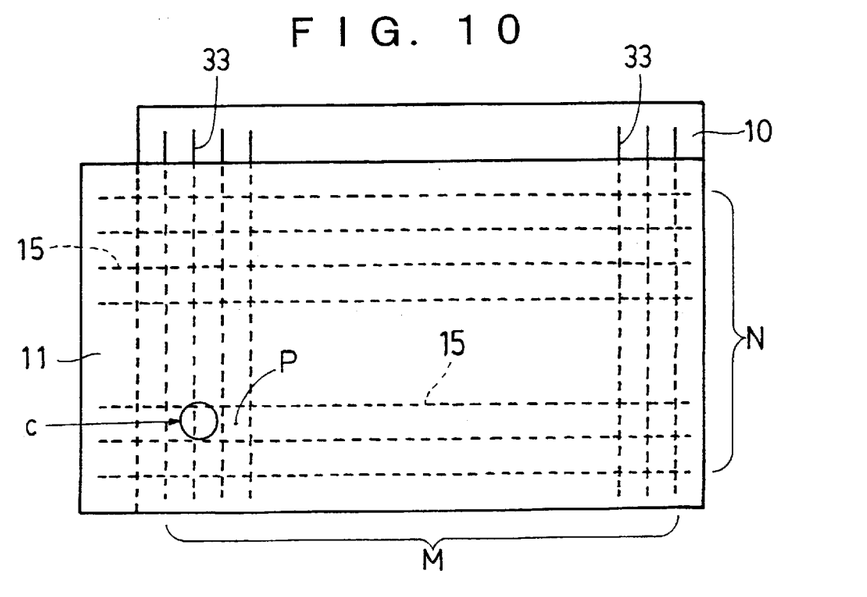
FIG. 10 is a plan view of the entire liquid crystal display illustrating the third embodiment of the present invention.
Figure 11:
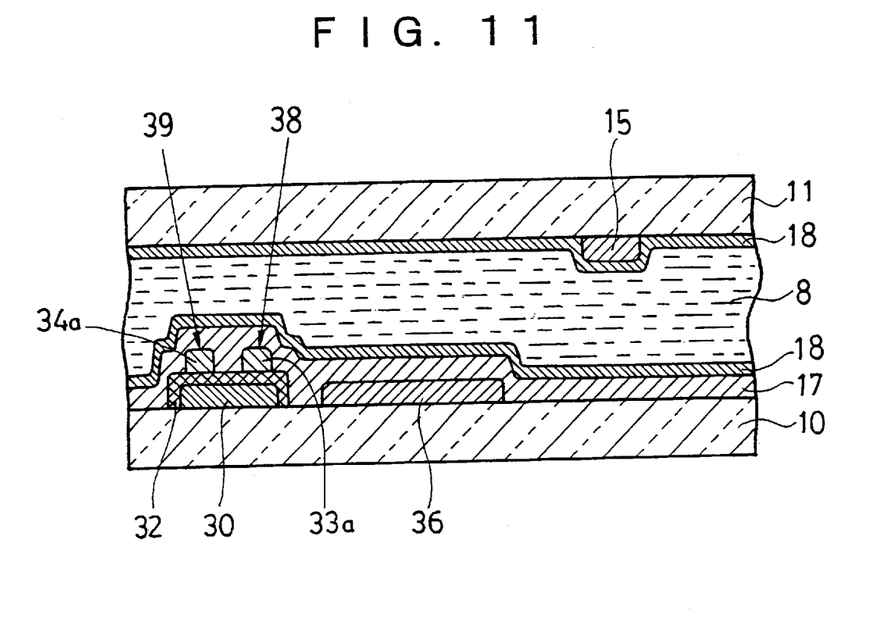
FIG. 11 is a sectional view taken along the line E—E of FIG. 9.
Figure 12:
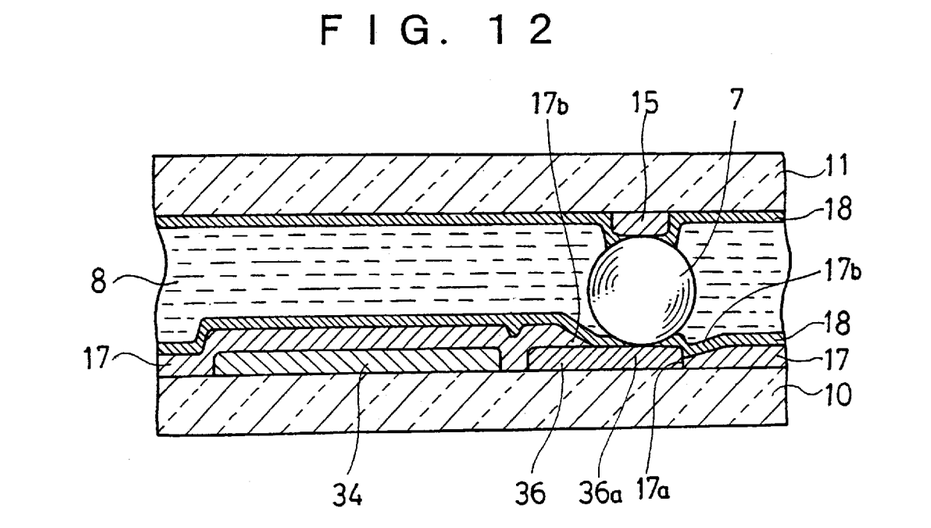
FIG. 12 is a sectional view taken along the line F—F of FIG. 9.

More specifically, as is apparent from FIG. 9 which is a diagrammatic enlarged plan view of the portion surrounded by the circle c in FIG. 10 and from FIG. 11 which is a sectional view taken along line E—E of FIG. 9, on the first substrate 10 there is first disposed an isolated electrode 30 made of tantalum (Ta), over the surface of which is formed a non-linear resistive layer 32 made of tantalum oxide ($Ta_2O_5$) film and serving as an anodic oxidation film.

Subsequently disposed on the first substrate 10 are M-lines of first electrodes 33 (see FIG. 10) made of chromium (Cr) and having for each display pixel part P a first upper electrode 33a which protrudes perpendicularly therefrom along the surface of the substrate which orthogonally intersects the isolated electrode 30.

In parallel with the first electrode 33 there is disposed a strip-like second electrode 34 made of chromium film (Cr) and having a second upper electrode 34a which extends at a right angle therefrom which orthogonally intersects the isolated electrode 30.

Thus, using the isolated electrode 30 as a common lower electrode, the isolated electrode 30, the non-linear resistive layer 32 and the first upper electrode 33a constitute at their intersection an MIM-type first non-linear resistance element 38, whereas the isolated electrode 30, the non-linear resistive layer 32 and the second upper electrode 34a constitute at their intersection an MIM-type second non-linear resistance element 39.

Additionally, the isolated electrode 30 is formed as follows.

A tantalum (Ta) thin layer is first formed over the entire surface of the first substrate 10 and then is patterned to form M-lines of line patterns including the isolated electrodes 30. All the line patterns are formed to connect to the common electrode for anodization at the periphery of the panel.

The first substrate 10 is then immersed in an anodizing liquid such as a solution of citric acid and ammonium phosphate, with a direct-current voltage being applied by the common electrode for anodization to form the non-linear resistive layer 32 on top of the surface of each line pattern.

Afterwards, the patterning is again performed to remove unnecessary portions from the line patterns to leave the isolated electrode 30 for each display pixel part.

The first non-linear resistance element 38 and the second non-linear resistance element 39 are back to back (BTB) connected to each other, allowing the voltage-current characteristics obtained when a positive voltage is applied to the first electrode 33 to become symmetric with those obtained when a negative voltage is applied thereto.

Furthermore, a comb-teeth type third electrode 36 made of chromium (Cr) film is disposed on the first substrate 10 in such a manner as to confront the strip-like second electrode 34 in the same plane. A portion 36a of the comb-teeth type third electrode 36 is so positioned as to confront (overlap) the counter electrode 15 on the second substrate 11. The other configurations are substantially the same as those of the first embodiment.

The first substrate 10 and second substrate 11 are opposed to each other at a predetermined distance with intervening conductive beads 7 comprised of resilient beads coated with gold to impart an electrical conductivity thereto, and are joined together at their peripheries by means of a sealing agent (not shown) so as to allow the liquid crystal 8 to be sealed thereinbetween.

In this case also, the areas at which the conductive beads 7 abut against the alignment layers 18 are ruptured, allowing the comb-teeth type third electrode 36 on the first substrate 10 to be electrically connected to the counter electrode 15 on the second substrate 11 by way of the conductive beads 7.

In this third embodiment as well, the width of the first electrode 33 and the widths of the strip-like second electrode 34, the comb-shaped third electrode 36 and the counter electrodes 15 are equally 20 μm. It is to be understood that in order to secure a more stabilized electrical connection the width of a portion of the counter electrode 15 overlapping the third electrode 36 and the width of the portion 36a of the comb-teeth type third electrode 36 confronting the counter electrode 15 are preferably larger than the width (20 μm) of the remaining portions of the counter electrode 15.

Furthermore, the dimensions of the opening 17a in the insulating film 17 on the portion 36a of the third electrode 36 are 50 μm×20 μm which are equal to those of the first embodiment, with the dimensions of the slant portion 17b of the insulating film 17 around the opening 17a being 70 μm×35 μm as well.

This third embodiment also ensures similar functional operations and effects to those in the case of the first and second embodiments as set forth hereinabove.

Moreover, by virtue of the symmetrical current-voltage characteristics as a result of BTB connection between the first non-linear resistance element 38 and the second non-linear resistance element 39, no direct-current voltage is applied to the liquid crystal layer, thereby making it possible to obtain a liquid crystal display having a higher display quality free from any sticking (residual image) phenomena.

Variants of the Embodiments

Although it has been described hereinabove that the tantalum film is used as the material for the first electrode 13 in the first embodiment and the second embodiment and for the isolated electrode 30 in the third embodiment, there may be used a tantalum (Ta) layer which contains nitrogen (N) besides the tantalum, a tantalum layer containing phosphorus (P) or a tantalum layer containing niobium (Nb).

The material for those electrodes can be a multilayered film consisting of a low-resistance material such as aluminum, copper or nickel and a tantalum film or a film containing impurities in addition to the tantalum.

Furthermore, in the first to third embodiments set forth hereinabove, an example has been described in which the tantalum layer is used as the material for the first electrode 13 or the isolated electrode 30, the surface of the tantalum layer being anodized to form the non-linear resistive layer 12 or 32 made of the tantalum oxide.

However, the material for the non-linear resistive layer 12 or 32 may be a silicon oxide film or a silicon nitride film to be disposed on top of the tantalum oxide film. Alternatively, use may be made of a non-linear resistive layer in the form of a multilayered film consisting of the tantalum oxide layer and the silicon oxide layer containing impurities.

In the case of using the non-linear resistive layer comprised of the multilayered film, it becomes possible to control the current-voltage characteristics of the non-linear resistance element. As a result, it also becomes possible to keep any excess current from flowing into the non-linear resistance element to thereby improve the characteristics of the liquid crystal display.

In each of the above-described embodiments, various modifications are possible of combinations of whether each pixel part contains a single non-linear resistance element or two as the switching element(s), or which of the second electrode and the third electrode is to be shaped like comb teeth or otherwise shaped, or whether the slant portion around the opening in the insulating film is to be formed or not, or how to arrange the conductive beads as the conductive members.

Furthermore, the present invention is not intended to be limited to the monochrome liquid crystal display, but is naturally applicable to any liquid crystal display capable of color display as well. In this case, for example, the second substrate side in the above embodiments may be provided with color filters including R (red), G (green) and B (blue) so as to correspond to each display pixel part.

INDUSTRIAL APPLICABILITY

As is clear from the above description, in the liquid crystal display which has the non-linear resistance elements and in which molecules of the liquid crystal are turned to the direction parallel to the substrates by means of the IPS method, the present invention enables the first electrode (signal electrode) and the counter electrode not to coexist on the same substrate, making it possible to avoid any electrical short circuit which is generated by the crossing of the two electrodes on the same substrate.

Moreover, in the process for joining the first substrate and the second substrate together, the conductive beads comprised of resilient beads coated with gold to impart an electrical conductivity thereto are employed as the spacers used to keep the distance between the first substrate and the second substrate constant, thereby allowing the island-like third electrode on the first substrate to be securely electrically connected to the counter electrode on the second substrate by way of the conductive beads.

The process for joining the substrates together does not especially need additional steps as compared with the conventional substrate joining process.

It is thus possible to provide a liquid crystal display having satisfactory wide viewing angle properties with high contrast and having a higher display quality, free from any pixel voids, at a low cost with a high productivity. Then, the resultant liquid crystal display is widely applicable as a display device for various data processing units, electronic equipment, audiovisual equipment, industrial equipment, etc.

What is claimed is:

1. A liquid crystal display in which a liquid crystal is sealed in between a first substrate and a second substrate which are opposed to each other in a parallel relationship, with a pair of conductive elements being arranged on the first substrate so as to form an electric field in a direction parallel to the substrate and in which in response to an electric field arising from a potential difference between the pair of conductive elements, a direction of the major axes of molecules of the liquid crystal is turned to the direction substantially parallel to a surface of one substrate to thereby obtain a contrast for performing a display, wherein on said first substrate, there are arranged a first electrode and a second electrode, a non-linear resistance element placed at an intersection between a part of said first electrode and a part of said second electrode, and said pair of conductive elements including an isolated third electrode and said second electrode, and wherein on a surface of said second substrate confronting said first substrate, there is disposed a counter electrode extending in a perpendicular direction intersecting said first electrode, said counter electrode being opposed to a portion of said third electrode on said first substrate, and wherein between said counter electrode and said portion of said third electrode, which are opposed to each other, there are disposed conductive members for electrically connecting said counter electrode and said third electrode with each other in said liquid crystal.

2. A liquid crystal display in which a liquid crystal is sealed in between a first substrate and a second substrate which are opposed to each other in a parallel relationship, with a pair of conductive elements being arranged on the first substrate so as to form an electric field in a direction parallel to the substrate and in which in response to an electric field arising from a potential difference between the pair of conductive elements, a direction of the major axes of molecules of the liquid crystal is turned to the direction substantially parallel to a surface of one substrate to thereby obtain a contrast for performing a display, wherein on said first substrate, there are arranged a first electrode, a second electrode, an isolated electrode, a pair of non-linear resistance elements placed at intersections between a part of said first electrode and said isolated electrode and between a part of said second electrode and said isolated electrode, respectively, and said pair of conductive elements including an isolated third electrode and said second electrode, and wherein on a surface of said second substrate confronting said first substrate, there is disposed a counter electrode extending in a perpendicular direction intersecting said first electrode, said counter electrode being opposed to a portion of said third electrode on said first substrate, and wherein between said counter electrode and said portion of said third electrode, which are opposed to each other, there are disposed conductive members for electrically connecting said counter electrode and said third electrode with each other in said liquid crystal.

3. A liquid crystal display according to claim 1, wherein said conductive members are conductive beads comprised of resilient beads with an electrical conductivity imparted thereto.

4. A liquid crystal display according to claim 2, wherein said conductive members are conductive beads comprised of resilient beads with an electrical conductivity imparted thereto.

5. A liquid crystal display according to claim 3, wherein on said first substrate there is disposed an insulating layer having an opening at an area corresponding to a portion of said third electrode, with a slant portion being formed around said opening of said insulating layer, said conductive beads being positioned in said opening with the aid of said slant portion.

6. A liquid crystal display according to claim 4, wherein on said first substrate there is disposed an insulating film having an opening at an area corresponding to a portion of said third electrode, with a slant portion being formed around said opening of said insulating layer, said conductive beads being positioned in said opening with the aid of said slant portion.

7. A liquid crystal display according to claim 3, wherein said conductive beads are dispersed in an adhesive and are interposed between said counter electrode and a portion of said third electrode.

8. A liquid crystal display according to claim 4, wherein said conductive beads are dispersed in an adhesive and are interposed between said counter electrode and a portion of said third electrode.

9. A liquid crystal display according to claim 1, wherein either one of said second electrode and said third electrode is a comb-teeth type electrode.

10. A liquid crystal display according to claim 2, wherein either one of said second electrode and said third electrode is a comb-teeth type electrode.

* * * * *